Feb. 23, 1960 K. L. KIRALY 2,925,762
MULTILENS TRANSMISSION FOR RANGE FINDER
Filed Aug. 21, 1956 2 Sheets-Sheet 2
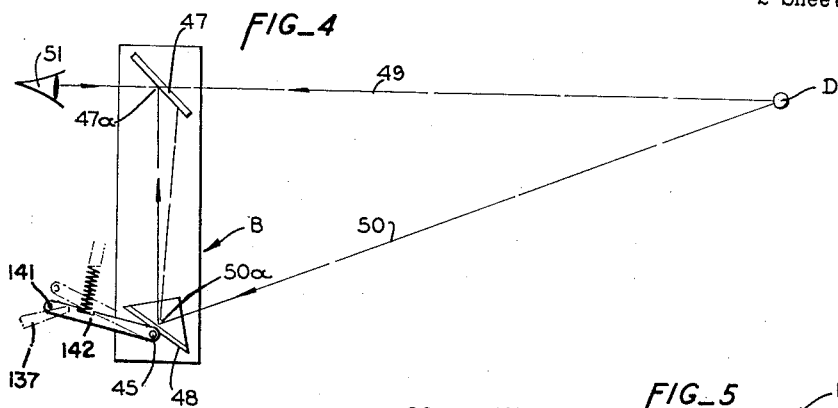
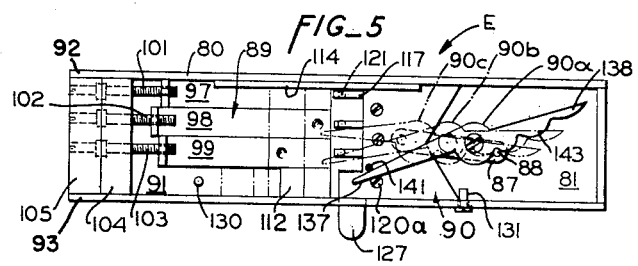
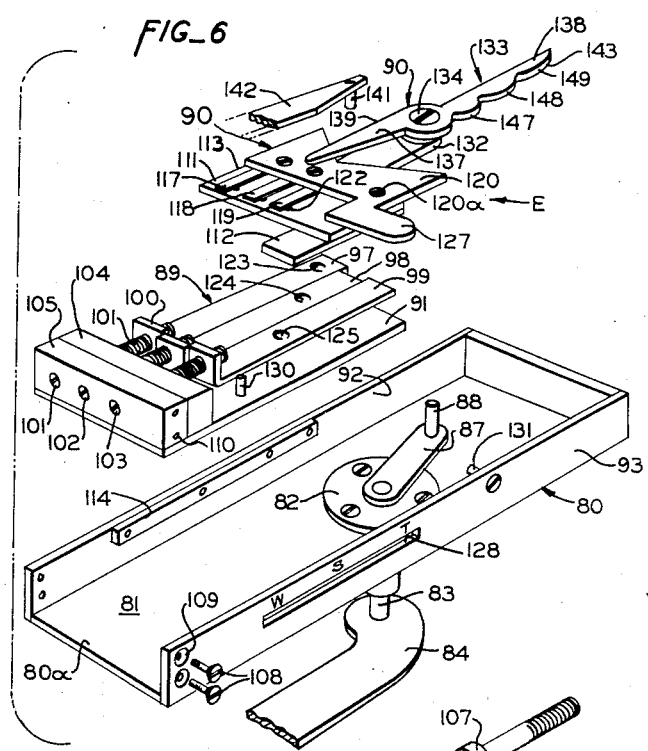
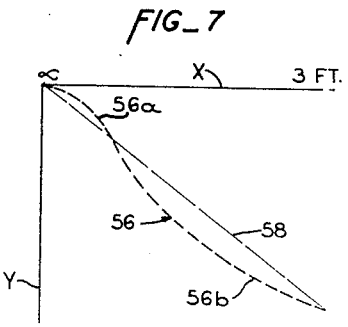
INVENTOR.
KARL L. KIRALY
BY Hansen and Lane
ATTORNEYS United States Patent Office 2,925,762
Patented Feb. 23, 1960

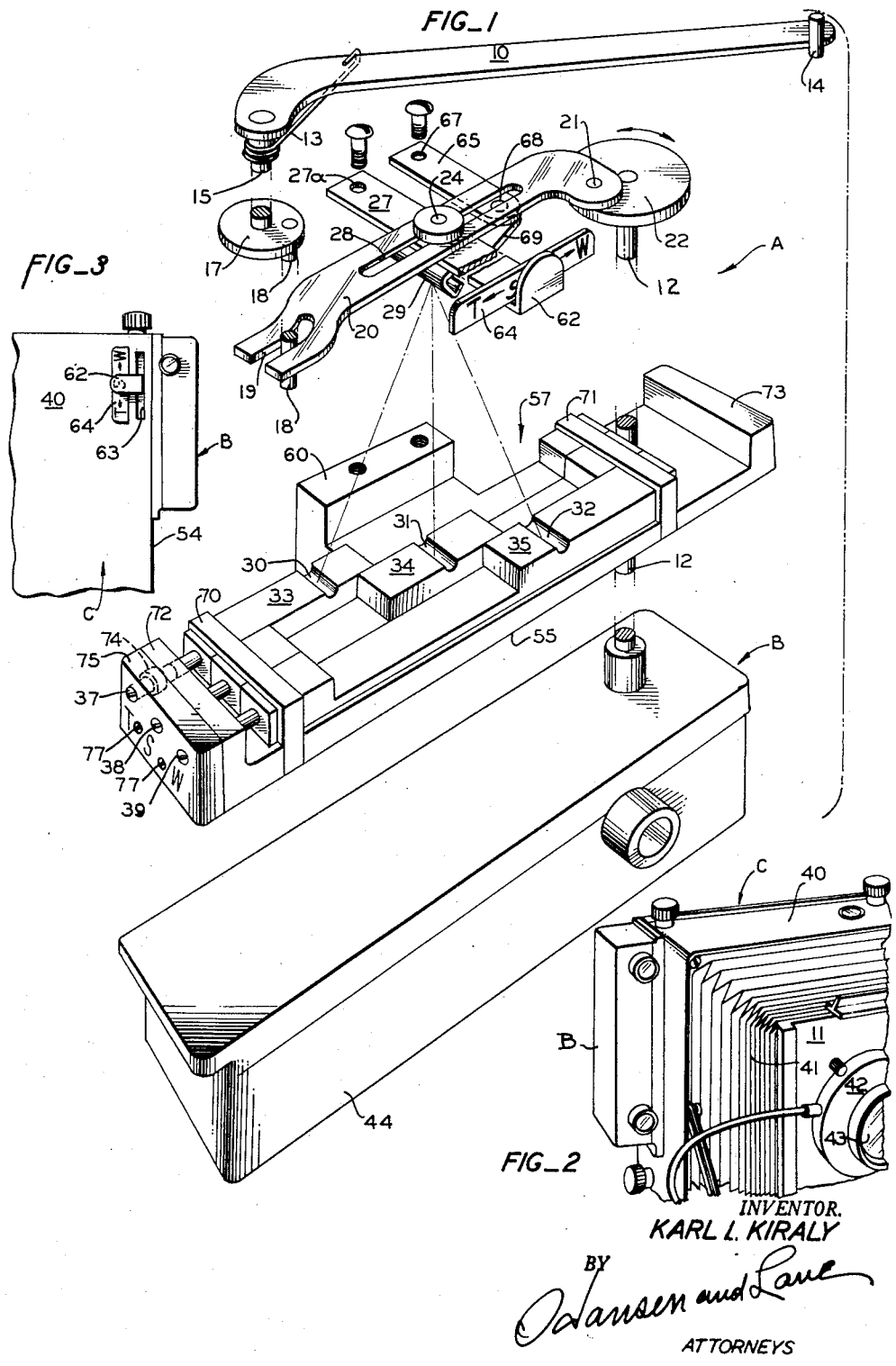

2,925,762

MULTILENS TRANSMISSION FOR RANGE FINDER

Karl L. Kiraly, San Jose, Calif.

Application August 21, 1956, Serial No. 605,330

8 Claims. (Cl. 95—44)

The present invention relates to camera range finders, and pertains more particularly to a motion transmission mechanism for coupling the lens mount of a camera to a divided image type range finder to adapt the range finder for use with interchangeable lenses of different focal lengths.

When focusing a camera by means of a ground-glass focusing back, or by means of a single lens reflex focusing arrangement, lenses of different focal lengths may be interchanged in the camera without difficulty, since with each lens the image seen on the focusing screen is the same as that which will be transmitted to the film.

When focusing a camera by means of a divided-image type of coupled range finder however, the range finder must be coupled to the lens mount in such a manner that when the divided images of a subject to be photographed as presented by the range finder are in properly matched relation, the particular lens mounted in the camera will be focused on the subject.

I have now devised a motion transfer mechanism for properly transmitting focusing movement of the lens mount of a camera to the actuating shaft of a divided-image type range finder mounted thereon for each of a plurality of lenses of different focal lengths mounted interchangeably on the lens mount.

The invention also provides means for coupling a camera lens mount to the actuating shaft of a predetermined divided-image type range finder, said coupling means being capable of adjustment to any one of a plurality of conditions for synchronizing the range finder with each of a selected plurality of lenses of predetermined different focal lengths mounted interchangeably on the lens mount.

A further object of the invention is to provide adjustable fulcrum support for a lever which operatively interconnects a range-finder to a lens mount so as to selectively vary adjustment of the range finder according to the individual requirements of each of a plurality of lenses of different focal lengths mounted interchangeably on the lens mount.

These and other objects and advantages of the invention will be apparent from the following description and the accompanying drawings, wherein:

Fig. 1 is an exploded, somewhat diagrammatic, view of a range finder and an adjustable coupling mechanism therefor, the latter embodying the present invention.

Fig. 2 is a fragmentary perspective view in reduced scale showing a camera with a divided image type range finder mounted thereon.

Fig. 3 is a fragmentary rear elevational view of a camera with the range finder coupling mechanism embodying the present invention mounted thereon.

Fig. 4 is a diagrammatic view showing the arrangement of the prisms or mirrors of a range finder of the type shown in Figs. 1 to 3 inclusive.

Fig. 5 is a plan view of an operative mechanism embodying the present invention adapted to be mounted on a camera of the type illustrated in Fig. 2.

Fig. 6 is an exploded perspective view of the mechanism shown in Fig. 5.

Fig. 7 is a graph showing the compensating effect of the present mechanism.

Fig. 8 is an enlarged perspective view showing one of the anchor member adjusting screws used in the mechanism illustrated in Figs. 5 and 6.

Briefly outlining the invention and referring first to Figs. 1 and 3 of the drawings, a range finder coupling or motion transfer mechanism A (Fig. 1) embodying the present invention is interposed between the usual main transfer arm 10 and the usual actuating shaft 12 of the divided image range finder B of the camera C. The transfer arm 10 is biased by a spring 13 in a conventional manner into engagement with an element 14 (Fig. 1) on the lens mount 11 (Fig. 2). Fore-and-aft movement of the lens mount during focusing swings the transfer arm 10 to turn the transfer arm shaft 15.

A crank disk 17 is secured on the transfer arm shaft 15, and a crank pin 18 on the disk rides in a curved notch 19 in one end of an adjustably fulcrumed motion transfer lever 20. The other end of the motion transfer lever 20 is journaled on crank pin 21 on a second disk 22 secured to the usual range finder actuating shaft 12. The motion transfer lever 20 is fulcrumed intermediately of its length on a pivot pin 24 mounted on a fulcrum control lever 27 and riding in a longitudinally slotted hole 28 in the motion transfer lever 20.

A latching tooth 29 is provided on the underside of the motion transfer lever 20 to engage selected detents 30, 31 and 32 formed in longitudinally adjustable detent bars 33, 34 and 35 respectively. Pivotal movement of the fulcrum control lever 27 from an adjusted position with the latching tooth 29 engaged in one of the detents 30, 31 or 32 to another thereof changes the location of the fulcrum pin 24 in the slotted lever opening 28 and thereby changes the mechanical advantage between the lens mount actuated main transfer arm 10 and the range finder actuating shaft 12.

Final adjustment of the fulcrum pin 24 in each of the three adjusted positions of the fulcrum control lever 27 is accomplished by screws 37, 38 and 39 which control the adjustment of the detent bars 33, 34 and 35, respectively.

The invention may be used on different types of focusing cameras, the camera C illustrated in Figs. 2 and 3 being of the so-called "press" type with an open-front, box-like housing 40 and a conventional bellows 41 mounted therein. The bellows 41 is connected at its forward end to the lens mount 11 which has a usual shutter 42 and lens 43 of predetermined focal length mounted thereon. The lens mount 11 is arranged for forward and rearward focusing adjustment relative to the camera housing 40 by conventional focusing means, not shown.

The divided-image type range finder B is of a well known accessory type and is mounted on a side of the camera housing 40. The range finder comprises a housing 44 with a usual lightly silvered transparent mirror 47 and an adjustable prism 48 (Fig. 4). The prism 48 is arranged for angular adjustment relative to the mirror 47 by means of a usual range finder actuating shaft 45. Rotative movement of the shaft 12 allows one to bring into register with each other the two images of a subject D produced by one set of light rays 49 passing through the transparent mirror 47 and by other light rays 50 reflected at 50a by the prism 48 onto the mirror 47 and thence again reflected at 47a by the mirror 47 to the eye 51 of the photographer. Focusing is accomplished by bringing into predetermined register the two images of the subject to be photographed produced by the two sets of light rays 49 and 50. Since the camera C and range finder B are of well known types, and since they are not material to the invention except to provide its locale, it is unnecessary to describe them in further detail.

The novel features of the present invention reside in the adjustable coupling device illustrated in one embodiment thereof at A (Fig. 1), operatively interposed between a lens mount 11 and a range finder B to translate motion of the camera lens mount into rotative movement of the range finder actuating shaft 12, and to provide for changing the ratio of movement between these members to compensate for the interchanging of lenses of different focal lengths on the lens mount 11.

The range finder B is here illustrated as being fixedly mounted on the exterior of the camera housing 40, with the range finder actuating shaft 12 extending through the camera housing wall 54, and through the base 55 of a detent bar assembly 57 which may be mounted interiorly of the camera casing.

It is well known to those familiar with the art that camera lenses do not focus in exact proportion to their movement along their focal axes. For example, in the graph shown in Fig. 7, if the X-axis represents distance of the subject from a particular lens, and the Y-axis represents movement of the lens between a focused adjustment of three feet and infinity, the straight line 58 represents the curve which would result if the lens focused exactly in proportion to subject distance. The curved dotted line 56 however illustrates schematically the nature of this variance. Throughout one portion of the lens-to-subject focusing range the lens may have a slight plus focusing error as at 56a, while throughout the other portion of its focusing range the lens may have a slight minus focusing error as at 56b.

Since the curve for this error is quite constant for most lenses, the curvature of the notch 19 may be calculated to compensate in large part for this error in all three lenses to be used with the camera.

The fulcrum control lever 27 is pivotally connected at 27a to a lateral abutment 60 on the detent bar base block 55, and the fulcrum pin 24 on the fulcrum control lever fits closely, but slidably, within the slotted opening 28 in the adjustably fulcrumed lever 20.

The free end portion 62 of the fulcrum control lever 27 is bent at right angles to the remainder of the lever and projects through a slotted opening 63 (Fig. 3) in the rear of the camera housing 40 for manipulation by an operator. A position indicating plate 64 is secured to the rear of the camera housing 40 to underlie the lever end portion 62 and indicia letters "T," "S" and "W" are marked on the plate 64 to designate Telephoto, Standard, and Wide angle, respectively, in order that the operator of the camera may observe the position of the fulcrum control lever 27 to insure that it is in properly adjusted position for the particular lens mounted on the camera at the time.

The detent engaging tooth 29 of thin, springy metal for anchoring the fulcrum control lever 27 in each of its plurality of selectively adjusted positions, is pivotally connected by the fulcrum pin 24 to the under side of the fulcrum control lever 27. A parallel link 65 is pivotally mounted at 67 on the lateral abutment 60 of the base block 55, and is pivotally connected at 68 to a lateral extension 69 of the spring tooth 29 to hold the tooth 29 against pivotal movement relative to the detent bars 33, 34 and 35 when swinging the fulcrum control lever 27 to move the spring tooth 29 from one detent to another.

The detent bars 33, 34 and 35 are retained in slidable side-by-side position on the base block 55 by a pair of bands 70 and 71 which are secured to the base block 55 and closely encircle the detent bars 33, 34 and 35. End abutments 72 and 73 are provided one on each end of the base block 55. The three adjusting screws 37, 38 and 39 are journaled in the abutment 72 and are screwed into threaded holes provided therefor in the ends of their respective detent bars. A collar 74 (Fig. 1) on each detent adjusting screw seats in a recess provided therefor in the end abutment 72 and is retained against axial movement by a retaining plate 75 secured on the outer face of the end abutment 72 by screws 77. The heads of the adjustment screws 37, 38 and 39 are exposed through holes provided therefor in the plate 75.

Operation of the form A of the invention shown in Figs. 1 and 3 is as follows: With the range finder B mounted on the camera C, and the control mechanism A of the present invention operatively interposed between the range finder and the lens mount 11, the fulcrum control lever 27 is mounted with its angularly bent end portion 62 projecting through the slotted opening 63 in the camera housing 40.

When using a so-called standard lens, for example the lens 43 mounted in the lens mount 11, the fulcrum control lever 27 is moved to position the bent end portion 62 thereof over the letter "S" on the position indicating plate 64 as illustrated in Fig. 1. With the fulcrum control lever 27 in this position, the sprng tooth 29 enters the detent 31 in the central detent bar 34, thereby firmly positioning the fulcrum pin 24 against accidental displacement.

When the standard lens 43 is replaced by a telephoto lens, not shown, of known focal length, the fulcrum control lever 27 is swung to position the projecting end portion 62 thereof over the letter "T" on plate 64, thereby moving the spring tooth 29 into the detent 30 in detent bar 33. This moves the fulcrum pin 24 on the fulcrum control lever 27 so as to decrease the mechanical advantage of the adjustably fulcrumed motion transfer lever 20 between the crank pin 18 on the main transfer shaft 15 and the crank pin 21 on the range finder actuating shaft 12.

When a wide angle lens (not shown) is mounted on the lens mount 11, the fulcrum control lever 27 is swung to position the bent end portion 62 thereof over the letter "W" on the plate 64, thereby moving the spring tooth 29 into the detent 32 in detent bar 35.

Final adjustment to provide accurate focusing for each individual lens to be used may be made by slidably adjusting each detent block as required by means of the screws 37, 38 and 39 exposed through the plate 75 on the end abutment 72.

The modified form E of the invention shown in Figs. 5 and 6 comprises a base housing 80, which also provides support for a conventional range finder, which may be of the type B shown in Figs. 1, 2 and 3 and diagrammatically in Fig. 4. A bottom plate 81 of this housing has a bearing 82 mounted therein. The main transfer shaft 83 is journaled in the bearing 82 and the main transfer arm 84 is secured on the outer end of this main transfer shaft. The transfer arm 84, like the transfer arm 10 of Fig. 1, is controlled by fore-and-aft focusing movement of the lens mount of the camera on which the device is mounted. A crank arm 87 is affixed to the inner end of the main transfer arm shaft 83 within the housing 80, and a crank pin 88 is mounted on the outer end of this arm. Within the housing 80 also are mounted a fixed detent bar assembly 89 (Fig. 6) and a slidably adjustable motion transfer lever assembly 90.

The fixed detent bar assembly 89 comprises a base plate 91 of a size to fit snugly between the side walls 92 and 93 of the housing, and a plurality (in the present case three) adjustable detent bars 97, 98 and 99. Each of the dentent bars is slidably supported on the base plate 91 and has threaded engagement in its upturned end portion 100 with adjusting screws 101, 102 and 103. These screws pass through holes provided therefor in a pair of laterally abutting housing end blocks 104 and 105. A collar 107 (Fig. 8), provided on each adjusting screw, rides in a recess, not shown, provided therefor at the abutting faces of the end blocks 104 and 105.

The housing end blocks 104 and 105 are of a length to fit snugly within the open end 80a of the housing 80, and are secured therein by screws 108 which are inserted in holes 109 in the side walls of the housing and are screwed into threaded holes 110 in the ends of the outer end block 105. The detent bars 97, 98 and 99 are guided for longitudinal sliding adjustment between the side wall 92, the housing bottom plate 81 (Figs. 5 and 6), a body plate 111 of the slidable lever assembly 90, and a guide strip 112 secured to the under side of the body plate 111 and at one side thereof.

The slidable lever assembly or slider 90 comprises the body plate 111 of a size to fit slidably between the housing side walls 92 and 93. The farther edge 113 of the slider 90 rides beneath a retaining strip 114 (Figs. 5 and 6) secured to the side wall 92 of the housing. Three narrow, spring steel strips 117, 118 and 119 are gripped between the upper surface of the slider body plate 111 and a slider top plate 120 attached to upper surface of the body plate 111 by screws 120a. Each of the spring strips 117, 118 and 119 has a detent engaging tooth 121 secured to its free end to extend downwardly through holes 122 provided therefor in the body plate 111.

Each detent tooth is positioned to engage one of the detents 123, 124 and 125 in the detent bars 97, 98 and 99 respectively. An adjusting arm 127 for controlling longitudinal movement of the slidable lever assembly 90 is formed integrally with the slider top plate 120, and extends outwardly through a longitudinally slotted opening 128 (Fig. 6) in the housing side wall 93.

A first stop pin 130 is mounted on the detent bar assembly bottom plate 91 to engage the guide strip 112 at one limit of movement of the slider 90, and a second stop pin 131 is mounted on the housing side wall 93 to engage the slider top plate 120 at the other limit of slider movement.

A motion transfer lever support arm 132 is formed integrally with the slider body plate 111 and extends lengthwise of the housing 80 beyond the slider top plate 120. A centrally fulcrumed motion transfer lever 133 is pivotally mounted on a stud 134 on the outer end of the arm 132, with arms 137 and 138 of the lever 133 extending in opposite directions from the pivot. The edge 139 of the motion transfer lever arm 137 is engaged by a pin 141 on the outer end of a usual range finder actuating arm 142 carried by a conventional range finder actuating shaft, as the shft 45 in Fig. 4, for tilting the rnge finder prism 48 during a focusing operation.

The edge 143 of the other motion transfer lever arm 138 bears against the crank pin 88 of the crank arm 87 on the main transfer shaft 83 to transmit rotary motion from the main transfer shaft 83 to the range finder arm 142. The lever arm edge 143 engaged by the crank pin 88 has three curved undulations 147, 148 and 149 formed therein. The curves of these three undulations are calculated similarly to the curvature of the notch 19 in the end of the adjustably fulcrumed lever 20 of Fig. 1 to correct for focusing variations in the lens as illustrated in the diagram of Fig. 8 and as explained previously herein.

When the slidable motion transfer lever assembly or slider 90 is in its right hand adjusted position 90a (Fig. 5) with the spring pressed tooth 121 of the spring 117 in detent 123 of detent bar 97, the distance from the range finder lever arm pin 141 and the pivot 134 of motion transfer lever 133 will be greater than the distance from the lever pivot 134 to the transfer arm crank pin 88. In this adjusted position of the slider 90, any movement of the crank pin 88 caused by a rotative movement of the main transfer shaft 83 will cause a greater movement of the range finder lever arm pin 141. This would be the position of adjustment of the slider for use with a telephoto or long focal length lens.

With the slider 90 moved to position the motion transfer lever 133 in its central position 90b of Fig. 5, the spring pressed tooth on the spring strip 118 will enter detent 124 in the central detent bar 98. In this position of the slider, the distance from the main transfer shaft crank pin 88 to the pivotal axis of the motion transfer lever 133 will be approximately equal to the distance from said lever axis to the range finder lever arm pin 141. In this adjusted position of the slider, therefore, a focusing movement of the crank pin 88 will cause a substantially equal movement of the range finder lever arm pin 141. This second adjusted position of the slider adapts the device for use with a standard lens.

With the slider moved still further to the left to bring the tooth of spring strip 119 into the detent 125 in bar 99, and the motion transfer lever 133 to the position 90c of Fig. 5, the mechanical advantage between the main transfer shaft crank pin 88 and the range finder lever arm pin 141 will be reversed from the condition shown at 90a in Fig. 5. The device then will be in condition for use with a short focal length or wide angle lens. Final adjustment of the detent bars 97, 98 and 99 is accomplished by turning their respective detent bar adjusting screws 101, 102 and 103.

The adjustment and use of the device shown in Figs. 5 and 6 will be apparent to one familiar with the art having an understanding of the operation of the device illustrated in Figs. 1, 2 and 3 as described previously herein.

The invention provides a simple, positive mechanism for coupling the lens mount to the range finder of a camera and one which may be easily adjusted for operation with each of a plurality of lenses of predetermined difficult focal lengths. Although the range finder B illustrated is of the exterior type, it would be a simple matter and well within the capabilities of a routine worker skilled in the art to adapt the invention for use with other divided image type range finders.

While I have illustrated and described a preferred embodiment of the present invention, it will be understood however that various changes and modifications may be made in the details thereof without departing from the scope of the invention as set forth in the appended claims.

Having thus described the invention, what I claim as new and desire to protect by Letters Patent is defined in the following claims.

I claim:

1. In combination with a camera having a lens mount mounted for focusing movement thereon, with means for mounting each of a plurality of lenses of different focal lengths on said lens mount, and having an optical range finder mounted on the camera with a first crank arm mounted on the camera for pivotal movement by a focusing movement of the lens mount, and with a second crank arm operatively connected to the range finder; a multi-stage transmission for individually focusing each such lens, and comprising a fulcrum mounted for movement along a path, a lever pivoted on the fulcrum for movement therewith and adapted to operatively engage a fixed element on each crank arm, whereby the mechanical advantage of the lever acting on the two crank arms is varied as the fulcrum is moved along its path, a plurality of releasable fulcrum anchoring means, one for each such lens, each of said anchoring means being positioned to anchor the fulcrum in a zone along said path determined by the focal length of a lens for which said each anchoring means is provided, and individual adjusting means operatively connected to each anchoring means for adjusting the position of the latter lengthwise of the path of fulcrum movement for exact focusing of an individual one of such lenses for which said each anchoring means is provided.

2. In combination with a camera having a lens mount mounted for focusing movement thereon, with means for mounting each of a plurality of lenses of different focal lengths on said lens mount, and having an optical range finder mounted on the camera with a first crank arm mounted on the camera for pivotal movement by a focusing movement of the lens mount, and with a second crank arm operatively connected to the range finder; a multi-stage transmission for selectively focusing each such lens, and comprising a fulcrum member mounted for movement along a path, a lever fulcrumed on the fulcrum member for movement therewith and adapted to operatively engage a fixed element on each crank arm, whereby the mechanical advantage between the two crank arms is varied as the fulcrum is moved along its path, a plurality of detent members, mounted in side by side relation adjacent said path, one detent member being provided for each such lens, means on said fulcrum member for independent latching engagement with each detent member for anchoring the fulcrum in a zone along said path determined by the focal length of a lens for which said each detent member is provided, and individual adjusting means operatively connected to each detent member for adjusting the position of the latter for exact focusing of an individual one of such lenses.

3. An arrangement according to claim 2 wherein the zone of the lever engaged by one of the crank arms in each of the individually anchored positions of the lever is curved to correct focusing aberration.

4. In combination with a camera having a lens mount mounted for focusing movement thereon, with means for mounting each of a plurality of lenses of different focal lengths on said lens mount, and having an optical range finder mounted on the camera with a first crank arm mounted on the camera for pivotal movement by a focusing movement of the lens mount, and with a second crank arm operatively connected to the range finder; a multi-stage transmission for selectively focusing each such lens, and comprising a housing adapted to be mounted between such camera and such range finder, and to serve as a base for such range finder, a fulcrum member mounted in said housing for movement along a path between such first and second crank arms, a lever fulcrumed on the fulcrum member for movement therewith and adapted to operatively engage a fixed element on each crank arm, whereby the mechanical advantage between the two crank arms is varied as the fulcrum is moved along its path, a plurality of releasable fulcrum anchoring means, one for each such lens, each of said anchoring means being mounted on said housing for releasably anchoring the fulcrum in a zone along said path determined by the focal length of an individual one of such lenses for which said each anchoring means is provided, and individual adjusting means operatively connected to each anchoring means for adjusting the position of the latter lengthwise of said path for exact focusing of its individual one of such lenses.

5. In combination with a camera having a lens mount mounted for focusing movement thereon, with means for mounting each of a plurality of lenses of different focal lengths on said lens mount, and having an optical range finder mounted on the camera with a first crank arm mounted on the camera for pivotal movement by a focusing movement of the lens mount, and with a second crank arm operatively connected to the range finder; a multi-stage transmission for selectively focusing each such lens, and comprising a housing adapted to be mounted between such camera and such range finder, and to serve as a base for such range finder, a slider mounted in said housing for movement along a path between such first and second crank arms, a lever fulcrumed on the slider for movement therewith and adapted to operatively engage a fixed element on each crank arm, whereby the mechanical advantage between the two crank arms is varied as the slider is moved along its path, a plurality of releasable anchoring members mounted adjacent the path of slider movement, one for each such lens, each of said anchoring members having a latching element for releasably anchoring the fulcrum in a separate zone along said path determined by the focal length of an individual one of such lenses for which said each anchoring member is provided, and individual adjusting means operatively connected to each anchoring member for adjusting the position of the latter lengthwise of said path for exact focusing of its individual one of such lenses.

6. In combination with a camera having a lens mount mounted for focusing movement thereon, with means for mounting each of a plurality of lenses of different focal lengths on said lens mount, and having an optical range finder mounted on the camera; a transmission base adapted to be fixedly secured between such range finder and such camera, a first crank arm pivotally mounted on the base, means for connecting said first crank arm in driven relation with the lens mount, a second crank arm pivotally mounted on the base, means for connecting the second crank arm in driving relation with the range finder, a slider mounted on the base and movable along a path extending between the two crank arms, latch means on said slider, a lever fulcrumed on the slider, and in biased operative engagement with both crank arms, means extending externally from the base for moving the slider and the lever fulcrumed thereon along said path, thereby to change the relative distances from the fulcrum to the zone of lever engagement with each crank arm to vary the mechanical advantage between the crank arms, a plurality of slider anchoring members mounted on said base adjacent the path of slider movement, one for each lens to be mounted on the lens mount, a separate latch engaging element on each anchoring member for engaging the slider mounted latch means, thereby to anchor the slider in a zone along the path of slider movement determined by the focal length of a lens for which said each anchoring member is provided, and individual adjusting means operatively connected between each anchoring member and the base for exact focusing of an individual lens for which said each anchoring means is provided.

7. An arrangement according to claim 6 wherein the latch means on the slider comprises a plurality of spring arms biased toward resilient engagement with the anchor members, and each anchor member is formed and located for latched engagement with an individual one of said spring arms.

8. Multi-lens transmission mechanism comprising, in combination with a camera having a lens mount mounted for focusing movement thereon, and an optical range finder mounted on the camera, a first element in driven relation with the lens mount, a second element in driving relation with the range finder, a lever fulcrumed intermediately of the first and second elements, and in biased engagement with each of said elements, means for moving the lever fulcrum along a predetermined path, thereby to change the relative distances from the fulcrum to the zone of lever engagement with each element, a latch element carried by the fulcrum and movable therewith, a plurality of fulcrum anchoring members mounted adjacent the path of movement of the latch element, a latch element on each anchoring member for latching engagement with the latch element carried by the fulcrum, thereby to anchor the fulcrum to each anchoring member at a selected zone along the path of fulcrum movement, and adjusting means operatively connected to each anchoring member for adjusting the position of the anchoring member and thereby of the fulcrum when the latter is latched thereto.

References Cited in the file of this patent

UNITED STATES PATENTS

| | | |
|---|---|---|
| 971,899 | Kennedy | Oct. 4, 1910 |
| 1,178,475 | Becker | Apr. 4, 1916 |
| 2,163,159 | Schwartz | June 20, 1939 |
| 2,261,421 | Steiner | Nov. 4, 1941 |
| 2,305,437 | Meyers et al. | Dec. 15, 1942 |
| 2,408,522 | Leef | Oct. 1, 1946 |
| 2,481,677 | McAdam et al. | Sept. 13, 1949 |
| 2,503,777 | Stoiber | Apr. 11, 1950 |

FOREIGN PATENTS

| | | |
|---|---|---|
| 742,599 | Great Britain | Dec. 30, 1955 |